(12) United States Patent
Kammerloher

(10) Patent No.: US 11,814,204 B2
(45) Date of Patent: Nov. 14, 2023

(54) METHOD AND DEVICE FOR PACKING OF INJECTION MOLDED PARTS

(71) Applicant: HEKUMA GMBH, Hallbergmoos (DE)

(72) Inventor: Jakob Kammerloher, Wolfersdorf (DE)

(73) Assignee: HEKUMA GMBH, Hallbergmoos (DE)

( * ) Notice: Subject to any disclaimer, the term of this patent is extended or adjusted under 35 U.S.C. 154(b) by 278 days.

(21) Appl. No.: 17/272,229

(22) PCT Filed: Aug. 27, 2019

(86) PCT No.: PCT/EP2019/072882
§ 371 (c)(1),
(2) Date: Feb. 26, 2021

(87) PCT Pub. No.: WO2020/043738
PCT Pub. Date: Mar. 5, 2020

(65) Prior Publication Data
US 2021/0261278 A1    Aug. 26, 2021

(30) Foreign Application Priority Data

Aug. 28, 2018 (DE) ..................... 10 2018 120 963.0

(51) Int. Cl.
*B65B 5/10* (2006.01)
*B65B 55/10* (2006.01)
(Continued)

(52) U.S. Cl.
CPC ............ *B65B 5/10* (2013.01); *B29C 45/1769* (2013.01); *B65B 35/10* (2013.01); *B29L 2031/753* (2013.01)

(58) Field of Classification Search
CPC ........... B65B 5/10; B65B 35/10; B65B 23/22; B65B 35/20; B65B 35/30; B29C 45/1769; B29L 2031/753
See application file for complete search history.

(56) References Cited

U.S. PATENT DOCUMENTS 4,642,967 A * 2/1987 Culpepper .............. B65B 35/44
198/419.3
5,273,152 A * 12/1993 Brun .................... B65G 47/907
425/534

(Continued)

FOREIGN PATENT DOCUMENTS

DE    102015109734 A1    12/2016
DE    102017118527 A1    2/2019
(Continued)

OTHER PUBLICATIONS

ISA European Patent Office, International Search Report Issued in Application No. PCT/EP2019/072882, dated Nov. 21, 2019, WIPO, 6 pages.

*Primary Examiner* — Hemant Desai
*Assistant Examiner* — Mobeen Ahmed
(74) *Attorney, Agent, or Firm* — McCoy Russell LLP

(57) ABSTRACT

Method for packing injection moulded parts, in particular parts used in medicine, like pipette tips, which are removed from cavities of an injection moulding machine and inserted into a storage or into packing containers, wherein the injection moulded parts are arranged in a workpiece holder, the injection moulded parts are removed from the workpiece holder in the form of first rows and these first rows are expanded, whereupon the injection moulded parts are removed from the expanded first rows in the form of second rows which extend perpendicular in relation to the first rows, and the second rows are expanded, whereupon the injection moulded parts from the second rows are inserted into packing containers or into a storage.

10 Claims, 18 Drawing Sheets

(51) Int. Cl.
  *B29C 45/17*   (2006.01)
  *B65B 35/10*   (2006.01)
  *B29L 31/00*   (2006.01)

(56) References Cited

U.S. PATENT DOCUMENTS

| | | | | |
|---|---|---|---|---|
| 5,443,360 | A * | 8/1995 | Lamb | B29C 49/4205 |
| | | | | 198/434 |
| 5,653,934 | A * | 8/1997 | Brun, Jr. | B29C 37/0007 |
| | | | | 425/441 |
| 5,829,222 | A * | 11/1998 | Schlagel | B65B 57/00 |
| | | | | 198/689.1 |
| 5,855,104 | A * | 1/1999 | Schlagel | B65B 57/14 |
| | | | | 53/54 |
| 6,156,258 | A * | 12/2000 | Takada | B29C 49/28 |
| | | | | 264/537 |
| 6,488,878 | B1 * | 12/2002 | Neter | B29C 49/6463 |
| | | | | 264/237 |
| 6,713,013 | B2 * | 3/2004 | Wunderlich | B29C 49/28 |
| | | | | 425/525 |
| 7,451,584 | B2 * | 11/2008 | Schateikis | B65G 47/71 |
| | | | | 53/448 |
| 7,743,587 | B2 * | 6/2010 | Hagenbrock | B65G 47/907 |
| | | | | 53/445 |
| 7,879,281 | B2 * | 2/2011 | Zoppas | B29C 49/6427 |
| | | | | 264/297.3 |
| 7,946,836 | B2 * | 5/2011 | Sicilia | B29C 45/7207 |
| | | | | 425/444 |
| 8,057,728 | B2 * | 11/2011 | Zoppas | B29C 45/4225 |
| | | | | 425/444 |
| 8,543,434 | B2 * | 9/2013 | Gaiser | B29C 45/40 |
| | | | | 425/572 |
| 9,061,780 | B2 * | 6/2015 | Boos | B65B 5/068 |
| 9,956,708 | B2 * | 5/2018 | Thoemmes | B29C 49/64 |
| 10,457,434 | B2 * | 10/2019 | Faltenbacher | B29C 45/1769 |
| 10,800,089 | B2 * | 10/2020 | Marastoni | B29C 49/6427 |
| 2004/0115302 | A1 * | 6/2004 | Rommes | B29C 37/0007 |
| | | | | 425/534 |
| 2004/0185136 | A1 * | 9/2004 | Domodossola | B29C 45/7207 |
| | | | | 425/534 |
| 2008/0093770 | A1 * | 4/2008 | Zoppas | B29C 45/4225 |
| | | | | 264/232 |
| 2008/0256789 | A1 * | 10/2008 | Fisch | B29C 45/42 |
| | | | | 425/351 |
| 2012/0124945 | A1 * | 5/2012 | Boos | B29C 45/1769 |
| | | | | 53/558 |
| 2014/0165511 | A1 | 6/2014 | Eberle et al. | |
| 2014/0331613 | A1 * | 11/2014 | Czizegg | B65B 35/38 |
| | | | | 53/448 |
| 2014/0331614 | A1 * | 11/2014 | Czizegg | B65B 25/00 |
| | | | | 53/448 |
| 2016/0244193 | A1 * | 8/2016 | Faltenbacher | B29C 45/4225 |
| 2019/0047196 | A1 * | 2/2019 | Czizegg | B29C 45/32 |
| 2022/0379532 | A1 * | 12/2022 | Wandura | B29C 45/42 |

FOREIGN PATENT DOCUMENTS

| | | |
|---|---|---|
| EP | 3424670 A1 | 1/2019 |
| WO | 2011003507 A1 | 1/2011 |
| WO | 2015049350 A1 | 4/2015 |

* cited by examiner

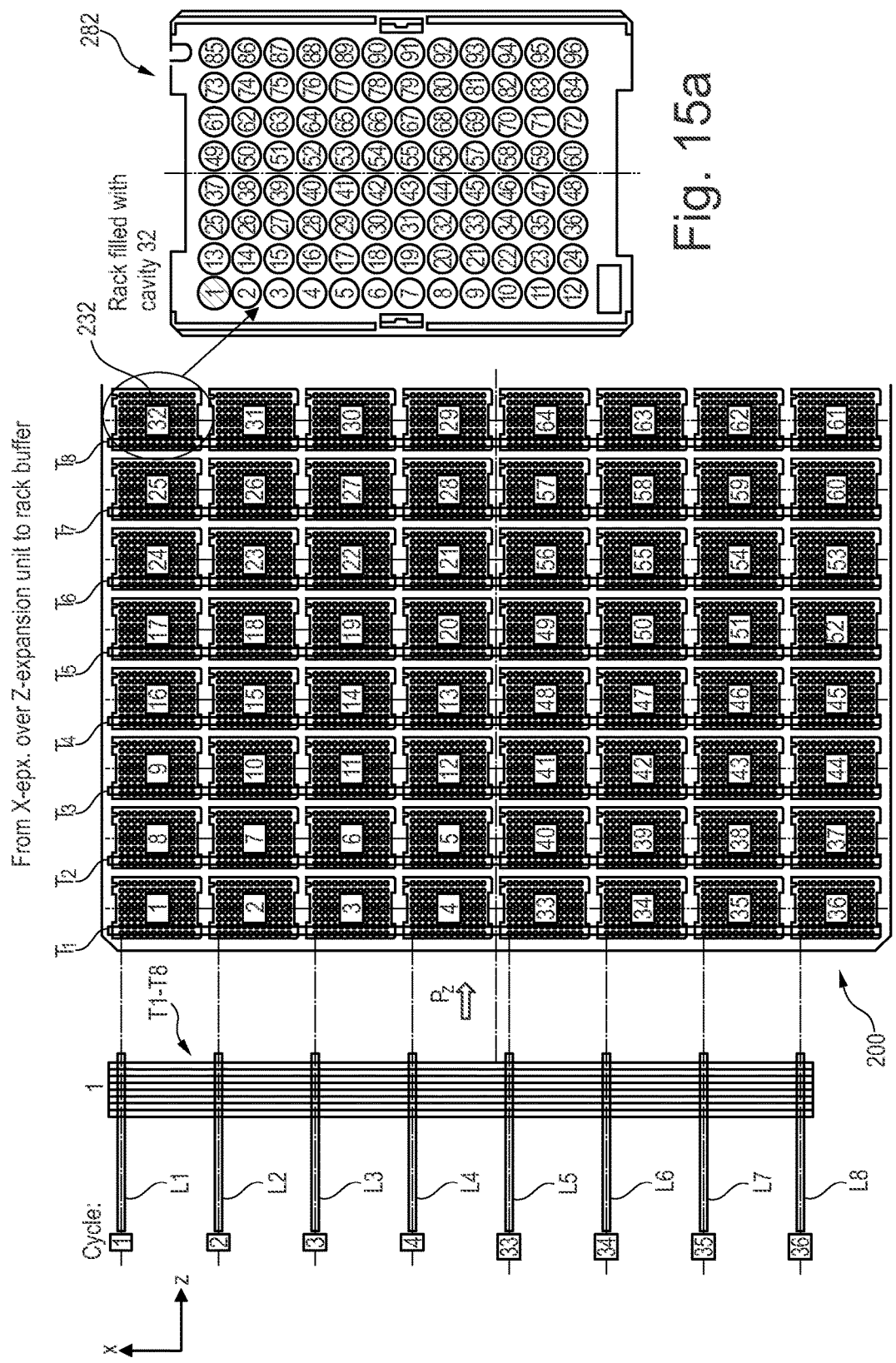

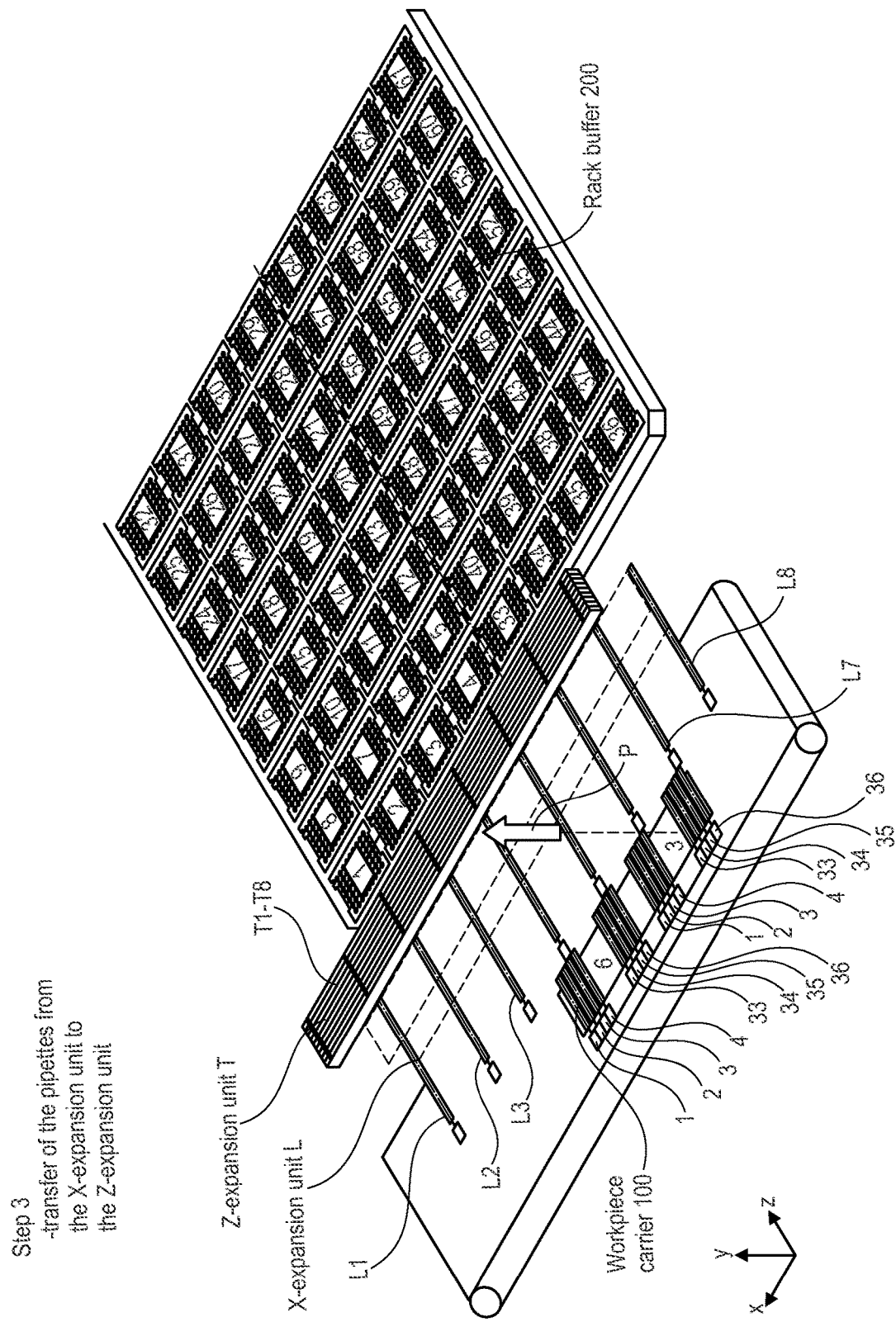

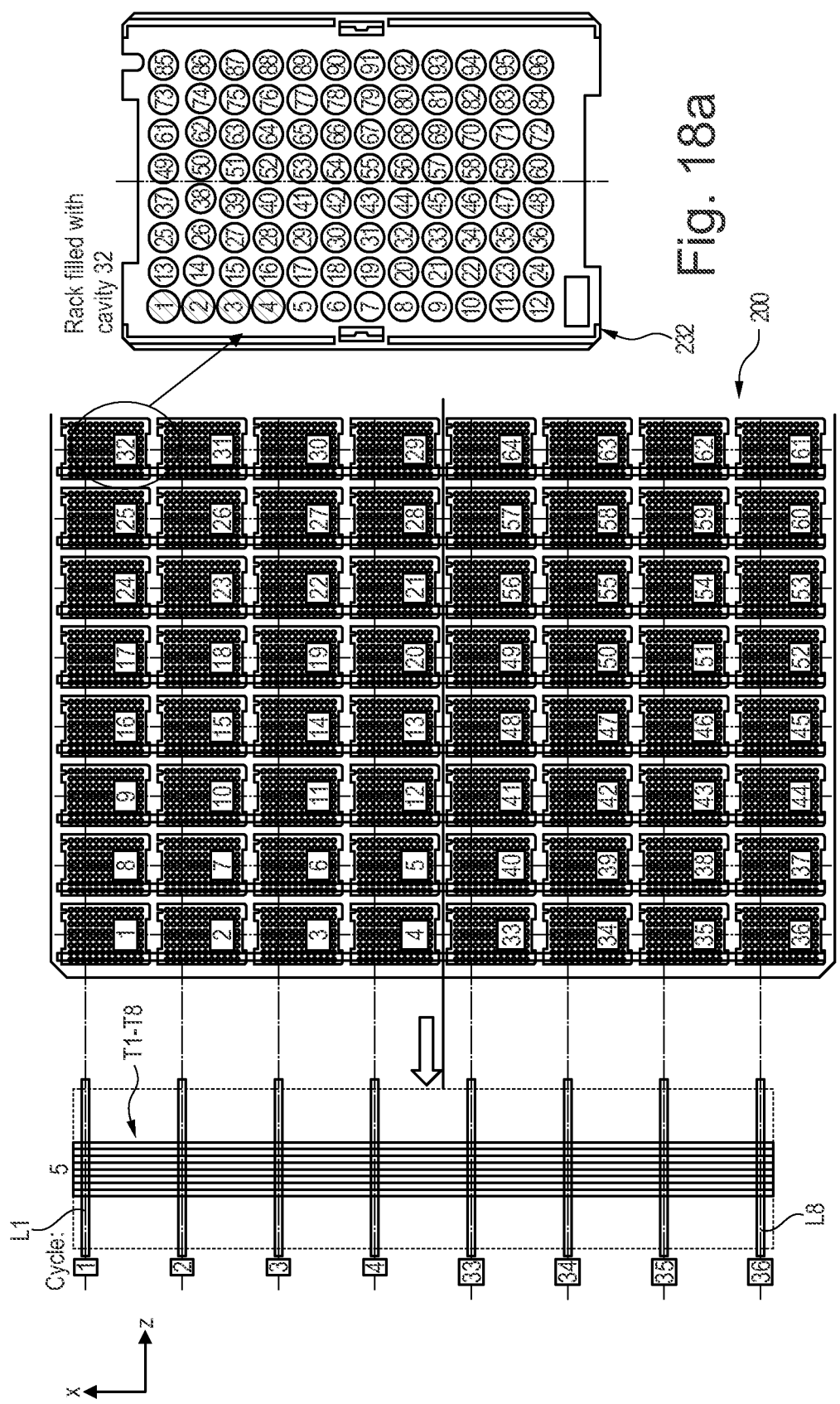

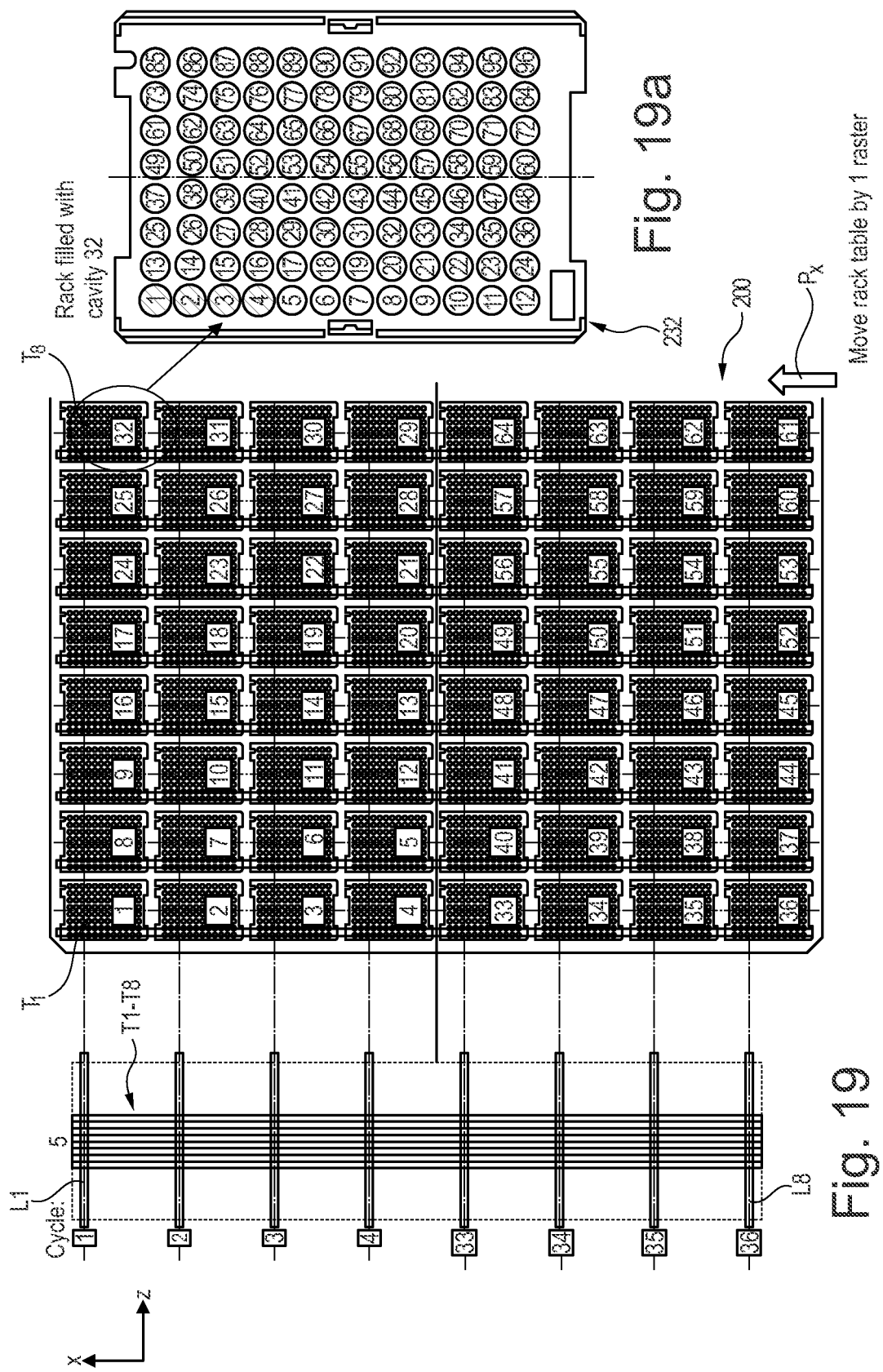

METHOD AND DEVICE FOR PACKING OF INJECTION MOLDED PARTS

CROSS REFERENCE TO RELATED APPLICATIONS

The present application is a U.S. National Phase of International Application No. PCT/EP2019/072882 entitled "METHOD AND APPARATUS FOR PACKAGING INJECTION MOULDINGS," and filed on Aug. 27, 2019. International Application No. PCT/EP2019/072882 claims priority to German Patent Application No. 10 2018 120 963.0 filed on Aug. 28, 2018. The entire contents of each of the above-listed applications are hereby incorporated by reference for all purposes.

TECHNICAL FIELD

The invention relates to a method and a device for packing of injection molded parts, in particular medical reaction vessels like pipette tips, wherein the injection molded parts are transferred from the injection molding machine to packing containers.

BACKGROUND AND SUMMARY

EP 3 052 388 describes such a method, wherein the injection molded parts or pipette tips are transferred in in-line arrangement into a workpiece holder after the injection molded parts were removed from a annular arrangement of the cavities in the injection molding tool and re-arranged into an in-line arrangement.

By means of the configuration according to the invention, it is to be achieved that packing containers can be provided with an intended mode of filling, in particular with a cavity-specific filling.

This is essentially achieved according to the invention in that, during the transferring of the injection molded parts from the workpiece holder to the packing containers or to a buffer storage upstream of the packing containers, first rows of injection molded parts removed from the workpiece holder and parallel to one another are expanded transversely in relation to their longitudinal extension (in x-direction), so that the rows have a predetermined, larger distance from one another, whereupon the injection molded parts are transferred from the expanded first rows into second rows which extend perpendicular in relation to the first rows, whereupon the second rows are moved transversely in relation to their longitudinal extension (in z-direction and thus in the longitudinal direction of the first rows) over the packing containers or the storage, and the injection molded parts from the second rows are transferred or inserted into the packing containers (racks) or into the storage.

In the plan view, the first rows and the second rows extending transverse in relation thereto substantially form a lattice structure in which the individual lattice bars (first rows and second rows) can be moved or displaced in relation to one another.

In this arrangement, the lattice spacing is variable by moving the first rows in an x plane and moving the second rows in a z plane, whereupon the filling of a storage or of the packing containers with injection molded parts from the second rows is carried out.

Altogether, by means of the lattice arrangement of the rows occupied by injection molded parts and their optional displaceability in relation to one another, a freely selectable pattern for the filling of packing containers or of a buffer storage is obtained.

Hereby, the individual first and second rows can be displaced in relation to one another by a displacement means. The individual rows of injection molded parts are preferably received in recesses of a rod or bar, which is provided with a drive of its own, like for example a servomotor, wherein the individual servomotors are controllable by an electronic control means such that the first rows and/or second rows connected therewith are displaced in relation to one another.

BRIEF DESCRIPTION OF THE FIGURES

An exemplary embodiment of the invention is explained in more detail with reference to the drawing, wherein FIG. 6a shows a view of the whole workpiece holder, wherein the part, represented in FIG. 6, of injection molded parts 01 to 64 is represented as section 1, FIG. 10 shows the workpiece holder after the third cycle of the injection molded part removal from the injection molding tool with the third section shown in FIG. 10a, FIG. 11 shows the second half of the workpiece holder with complete filling, wherein FIG. 14 shows a schematic plan view of eight support rods expanded in x-direction with transfer rods extending transverse in relation thereto, wherein the transfer rods are subsequently (FIG. 15) expanded horizontally in z-direction after they have removed injection molded parts from the support rods, FIG. 15 shows a plan view of a rack buffer with expanded transfer rods arranged above the rack buffer, wherein FIG. 15a shows a single rack of the rack buffer, FIG. 16 shows a schematic perspective illustration of the arrangement in FIGS. 14 and 15, wherein the transfer rods in the not yet expanded state are arranged above the third section of the support rods, FIG. 18 shows a view corresponding to FIG. 14 in another cycle, and FIG. 19 shows the expansion of the transfer rods above the rack buffer displaced in x-direction

DETAILED DESCRIPTION

The transferring, described in FIGS. 1 to 5, of the injection molded parts from the annular or circular arrangement of the cavities in the injection molding tool into an in-line arrangement in the workpiece holder, is described in detail in EP 3 052 388.

Figure 1:
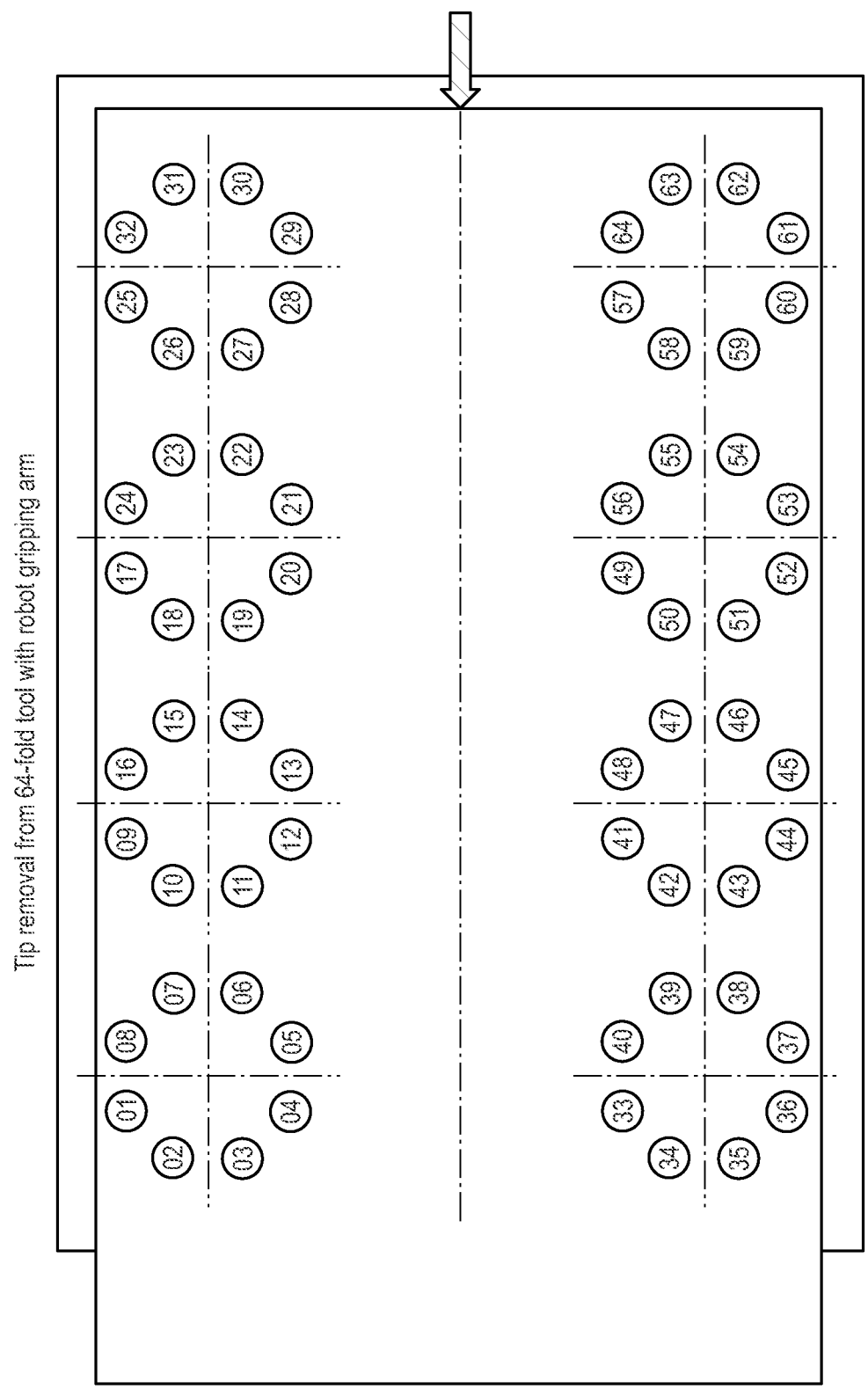
FIG. 1 shows a schematic view of the arrangement of the injection molded parts in cavities of a tool of an injection molding machine, wherein the eight annular arrangements are removed from the cavities of the injection molding tool by a 64-fold tool with robot gripping arm.
Figure 2:
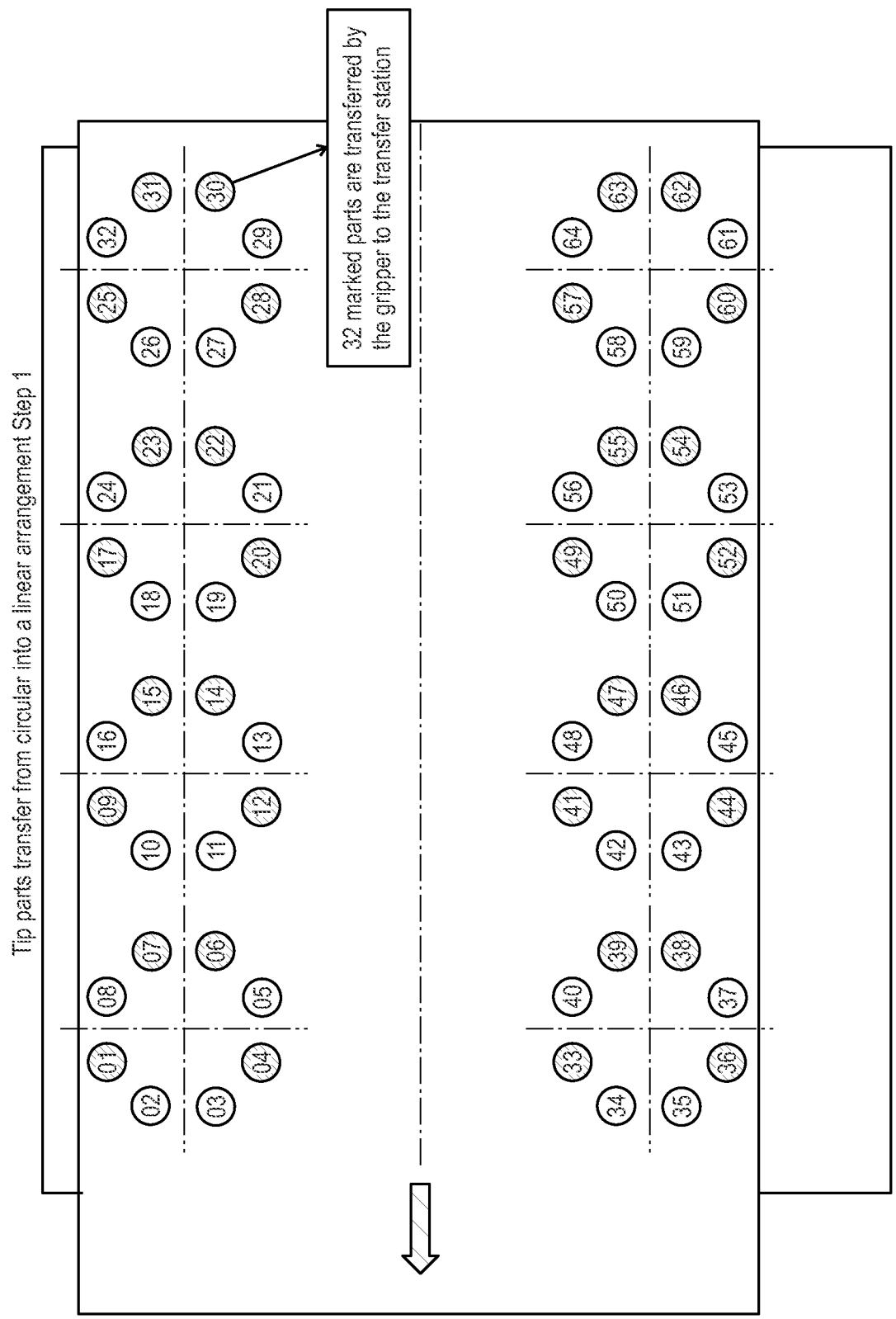
FIG. 2 shows a view of the arrangement in FIG. 1 with marking of the injection molded parts transferred in a first step for an in-line arrangement.
Figure 3:
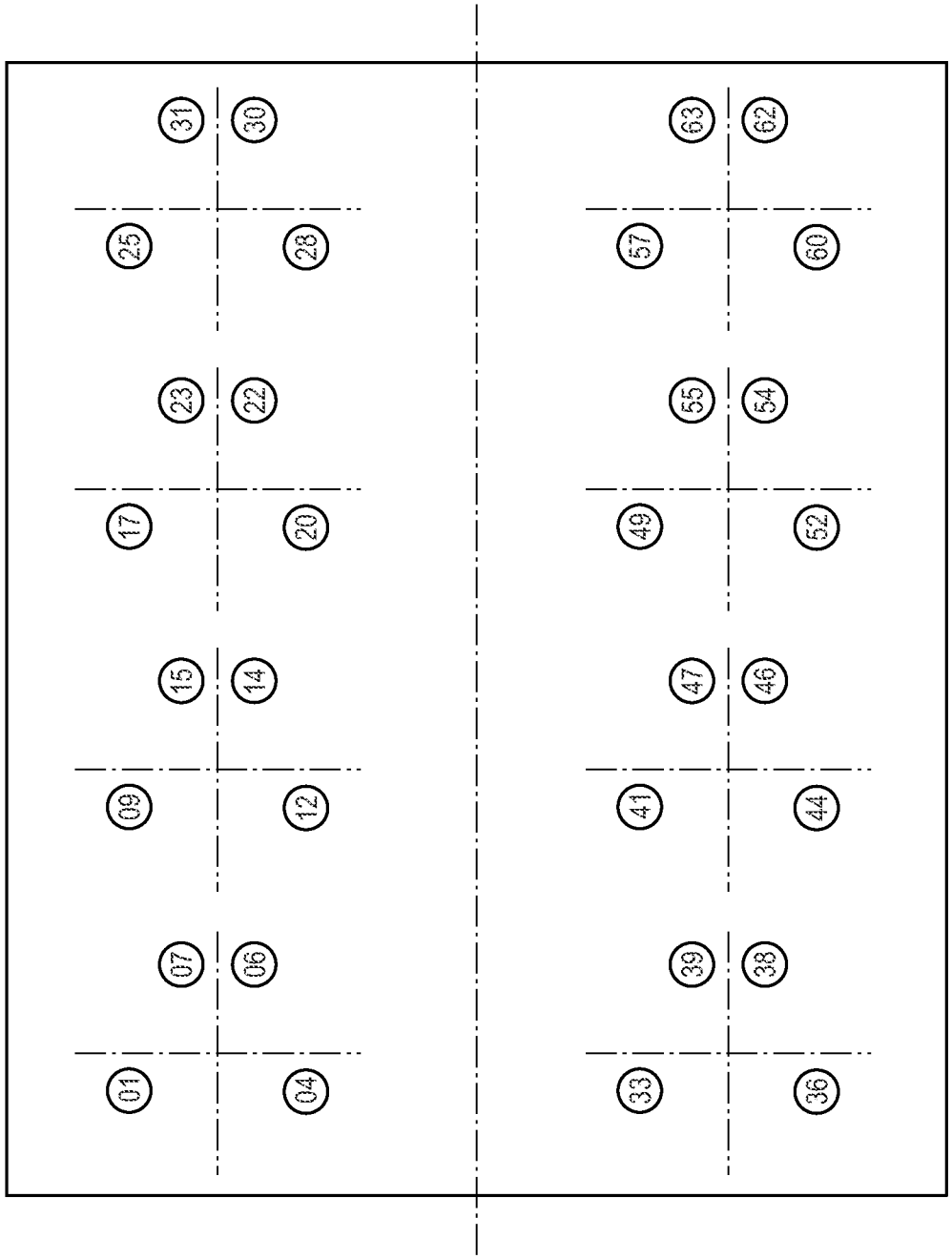
FIG. 3 shows the injection molded parts removed in FIG. 2 in their arrangement in a transfer station.
Figure 4:
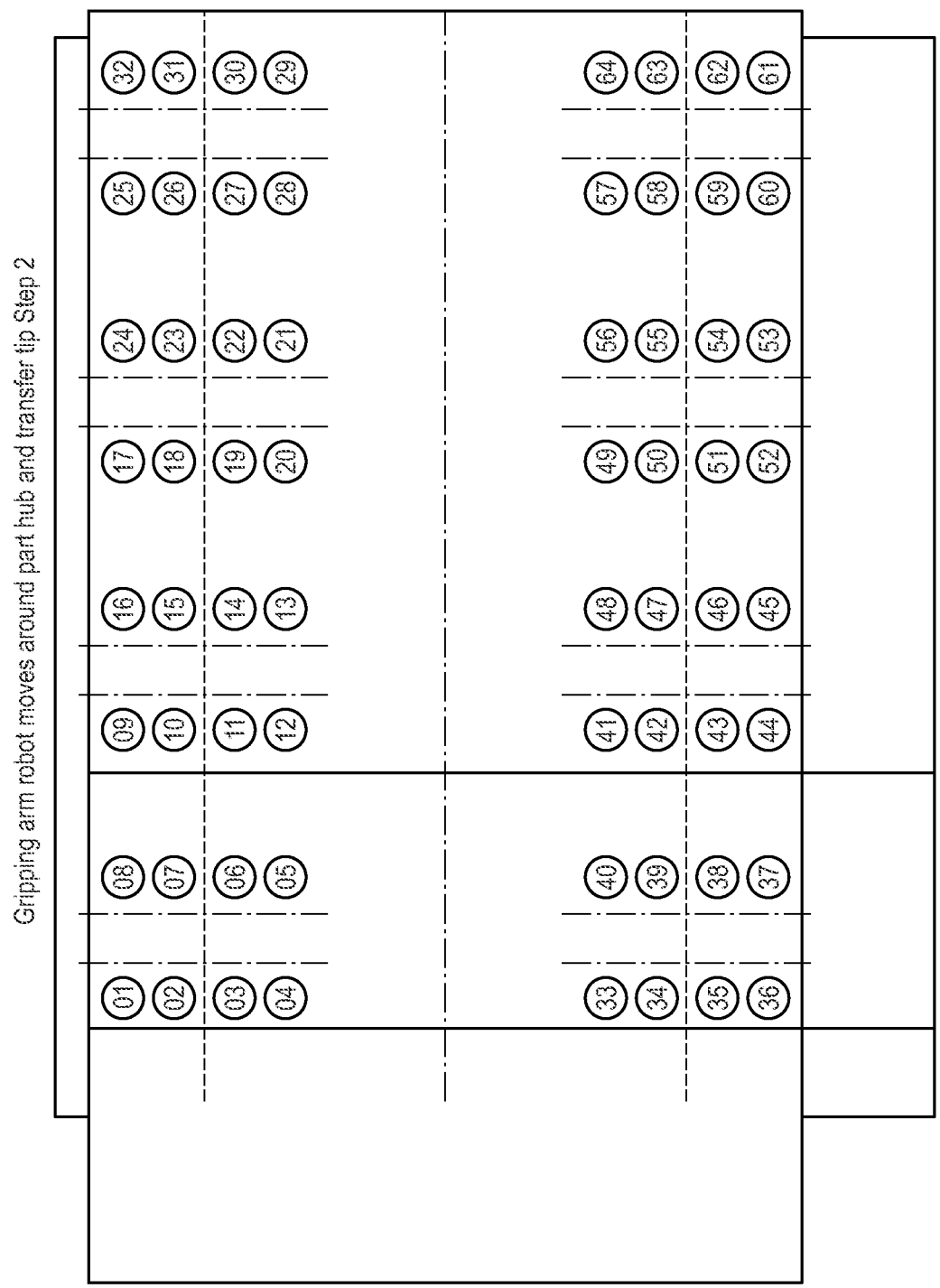
FIG. 4 shows the addition of the injection molded parts remaining in FIG. 2 to an in-line arrangement.
Figure 5:
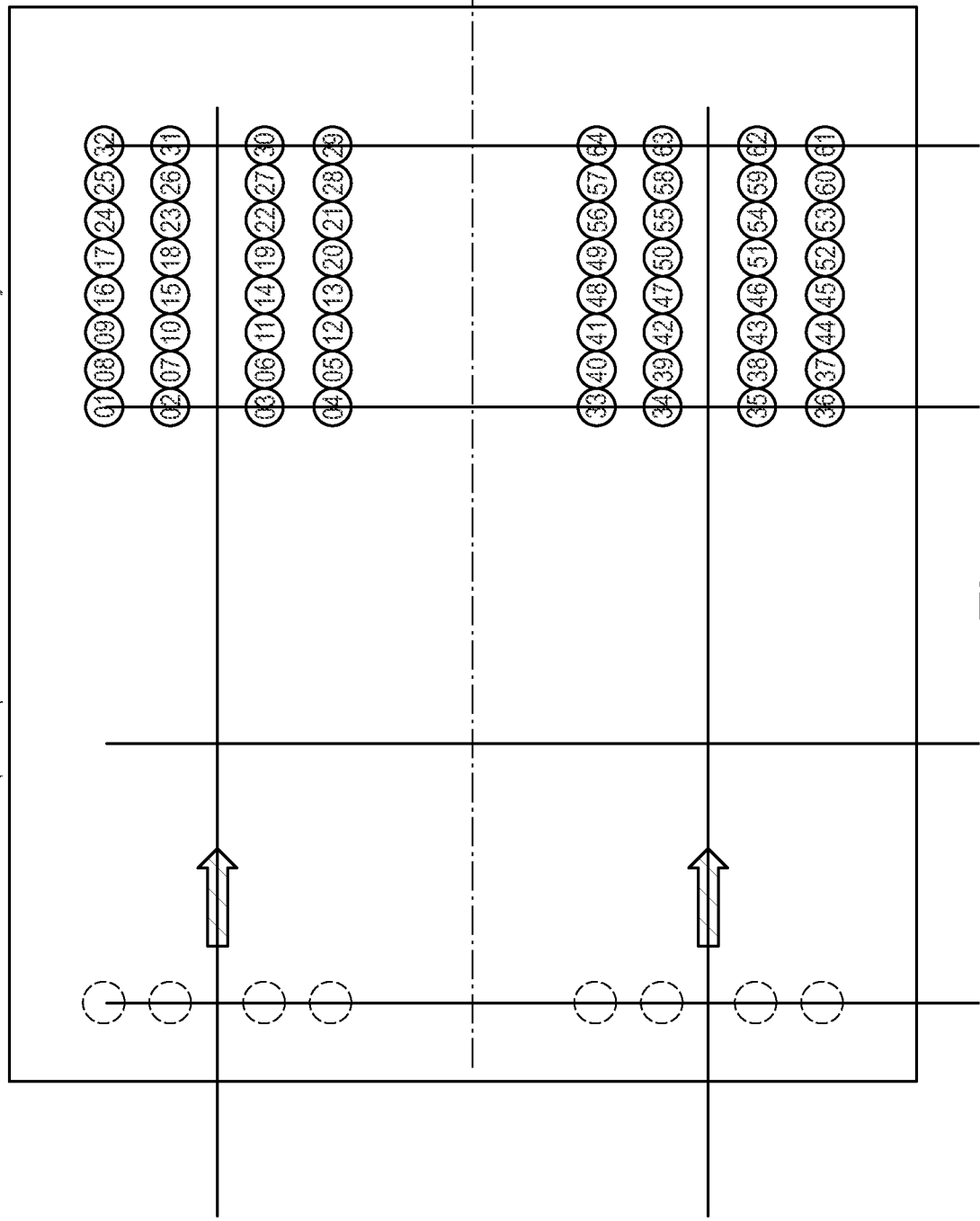
FIG. 5 shows the compacting of the eight vertical rows spaced apart in FIG. 4 into eight closely adjacent vertical rows.

In FIGS. 1 to 11, the individual injection molded parts or pipette tips (tips) are provided in each case with the numbers of the cavities in the injection molding tool according to FIG. 1.

Figure 6:
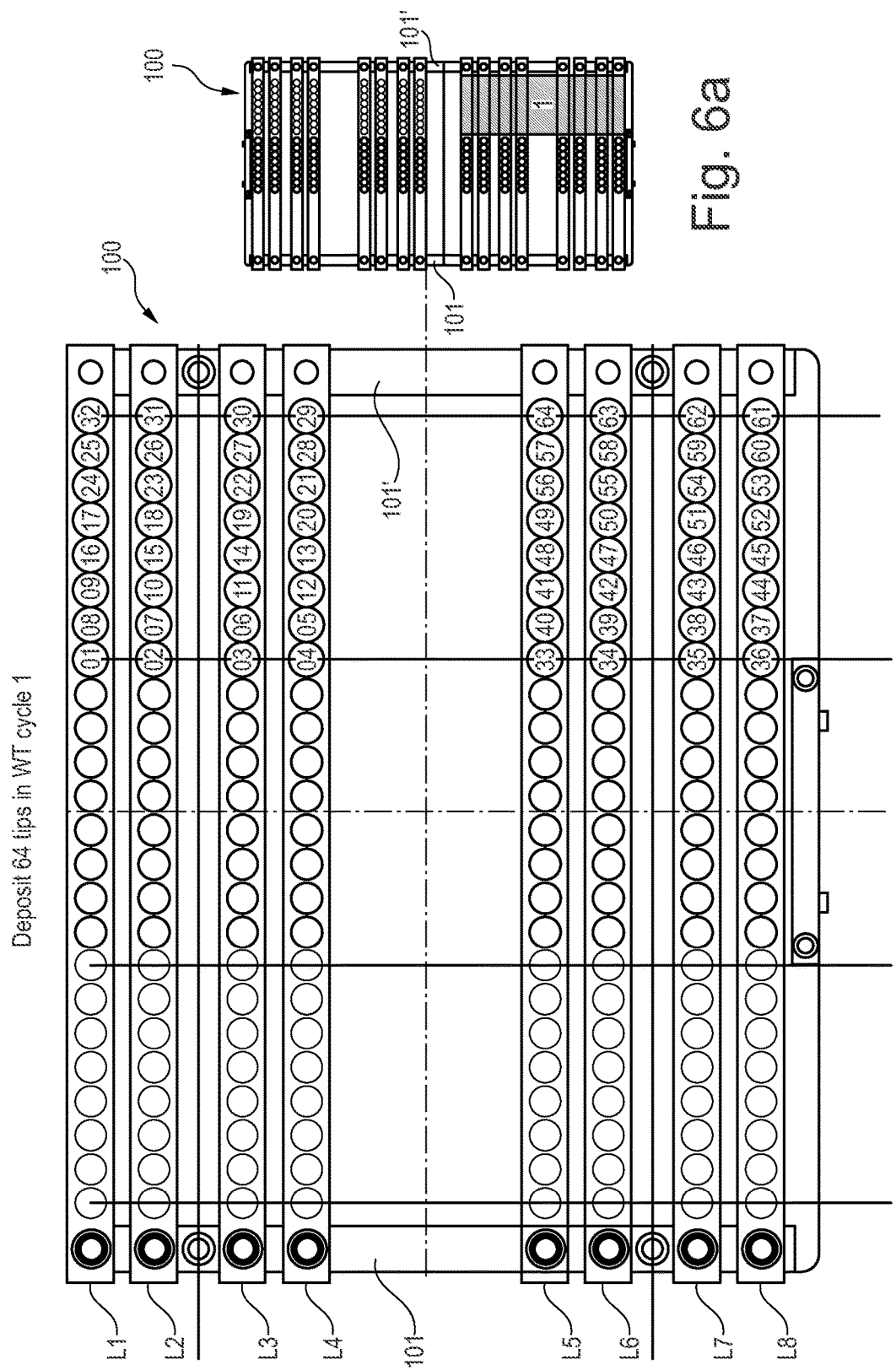
FIG. 6 shows in a plan view a half of a workpiece holder with eight horizontal support rods for receiving the eight rows of injection molded parts from FIG. 5.

FIG. 6 shows a plan view of a half of a workpiece holder 100, which has eight support rods L1 to L8, which are mounted at their ends on two longitudinal supports 101 and 101'. As an example of an arrangement, FIG. 6 shows two groups each of four rods, at a distance from one another on the two longitudinal supports 101, wherein in each group of four a sub-group of two rods are arranged at a smaller distance from one another. This arrangement of the support rods L in the workpiece holder 100 is to be seen as an example; it can vary by means of random spacings of the horizontal rows from one another and of the rows of injection molded parts extending vertical in relation thereto.

FIG. 6 shows the lower half of the complete workpiece holder 100 shown in FIG. 6a wherein the injection molded parts 01 to 64 of a first removal cycle, shown in detail in FIG. 6, are inserted in the section designated 1 in FIG. 6a. The individual support rods L1 to L8 can be removed from the two longitudinal supports 101, 101'.

Figure 7:
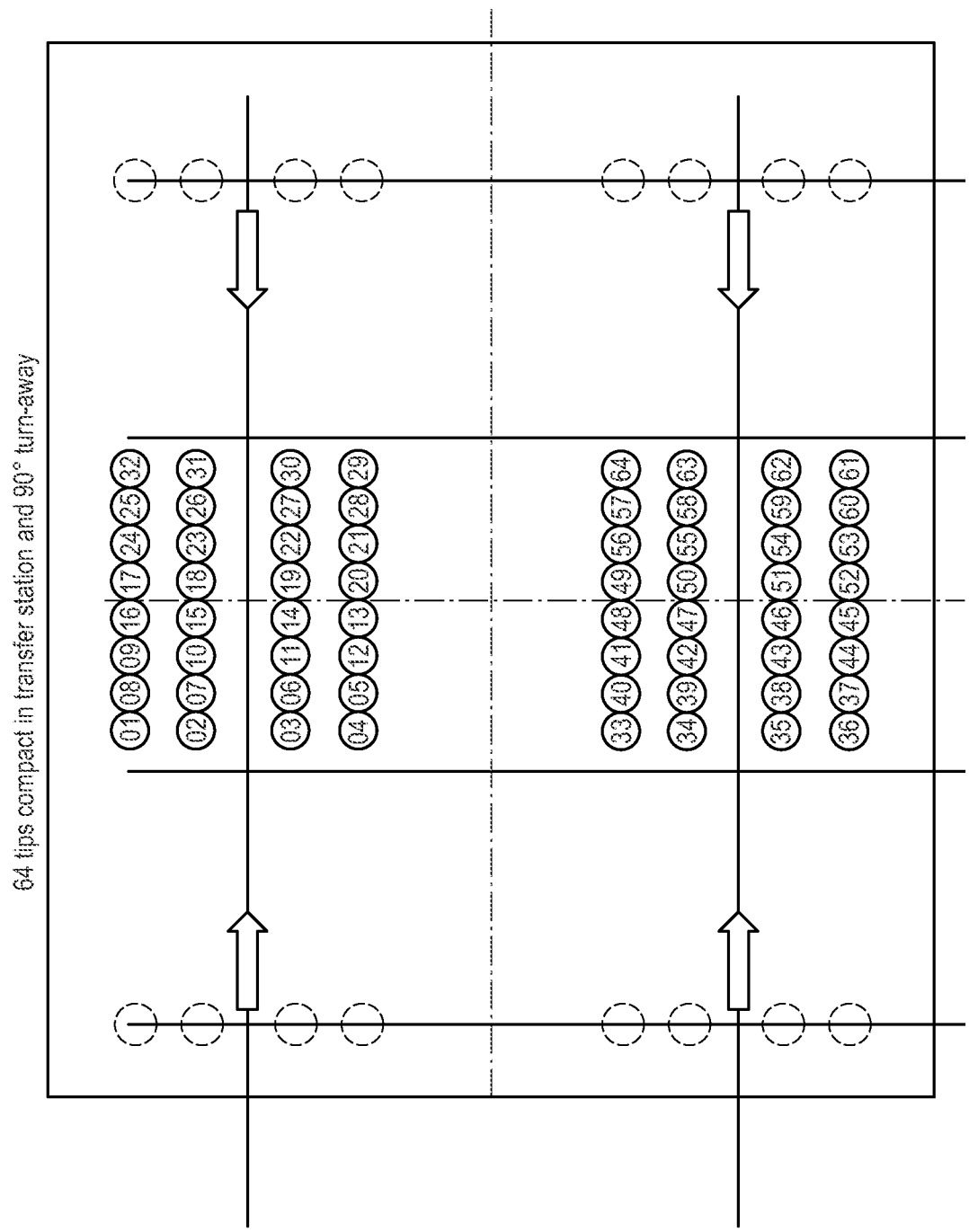
FIG. 7 shows an arrangement corresponding to FIG. 5 after a second cycle of the injection molded part removal.
Figure 8A:
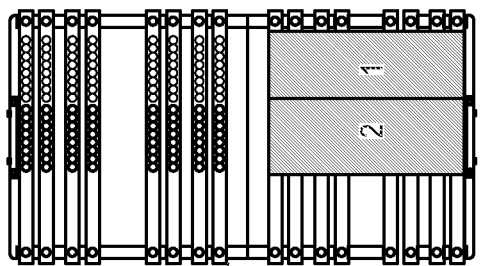
FIG. 8 shows, in a view corresponding to FIG. 6, injection molded parts 01 to 64 of the second removal cycle as section 2 in FIG. 8a, FIG. 9 shows a view corresponding to FIG. 5 and FIG. 7 after a third removal cycle.
Figure 8:
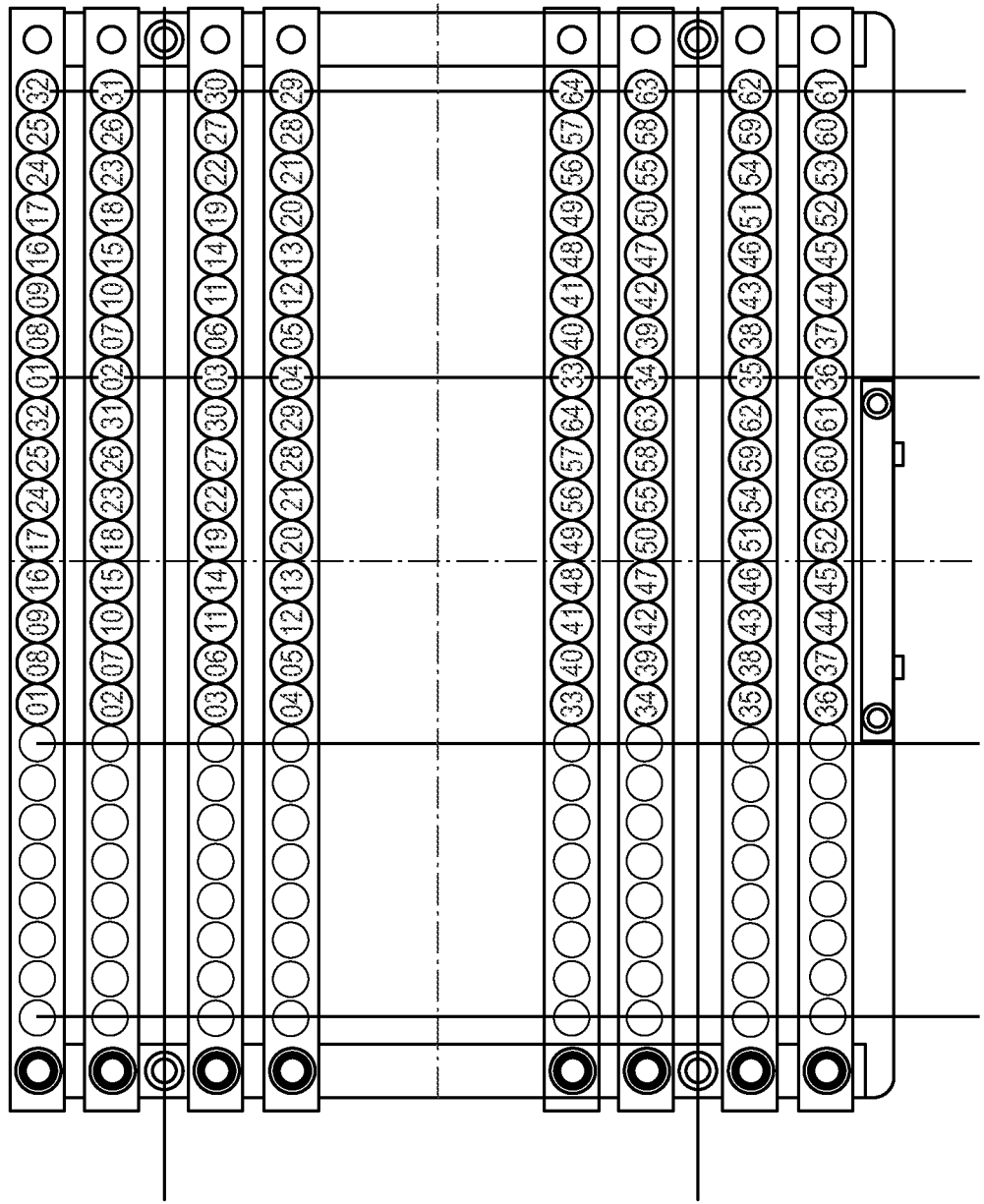
Figure 9:
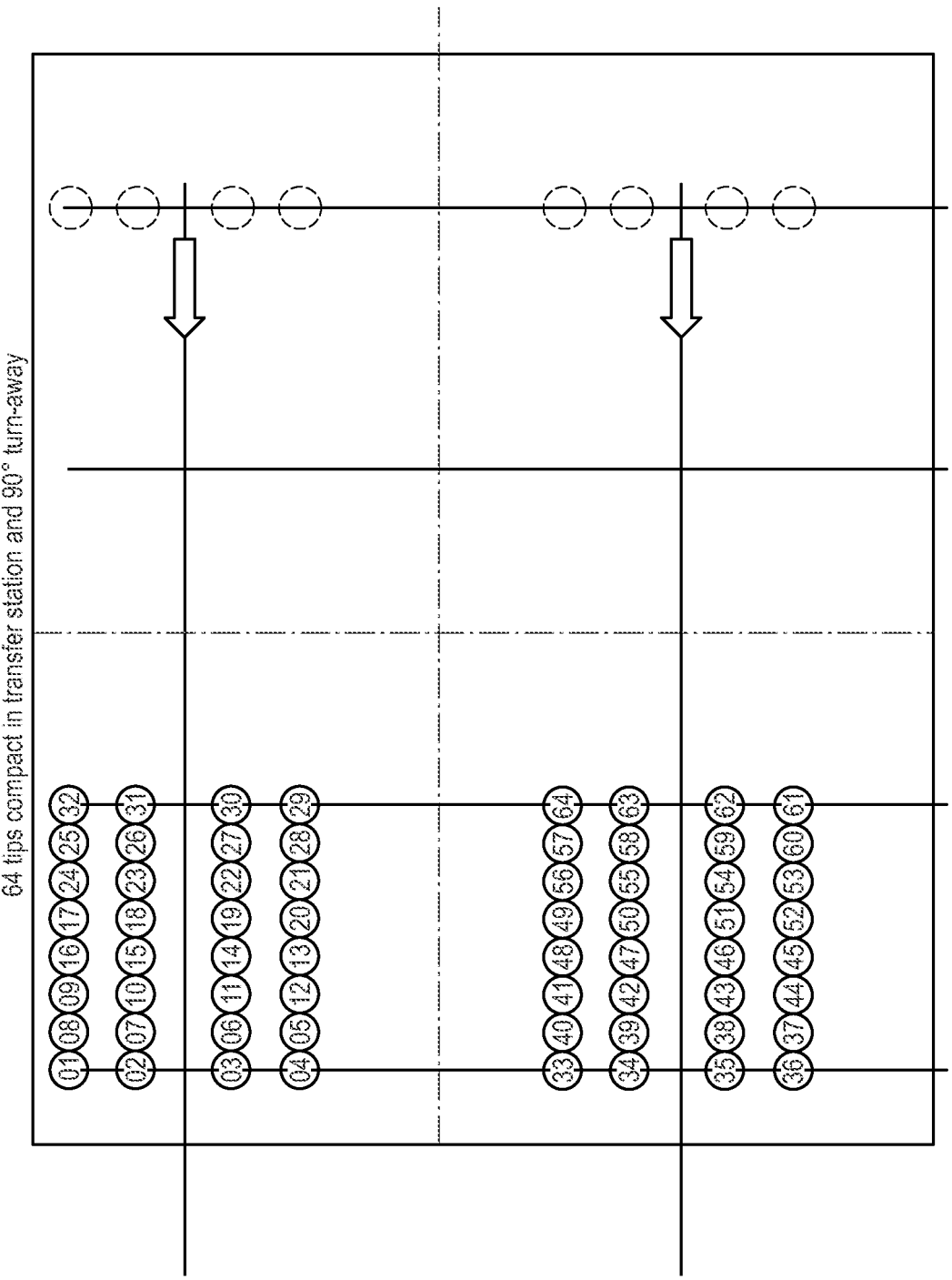

FIG. 7 shows the injection molded parts 01 to 64 of a second removal cycle which, in FIG. 8, are inserted in the workpiece holder 100 in the middle section 2 in FIG. 8a. In a corresponding way, FIG. 9 shows the injection molded parts 01 to 64 of a third removal cycle and FIG. 10 shows the arrangement thereof in the workpiece holder 100, wherein FIG. 10a shows this section as section 3.

Figure 10:
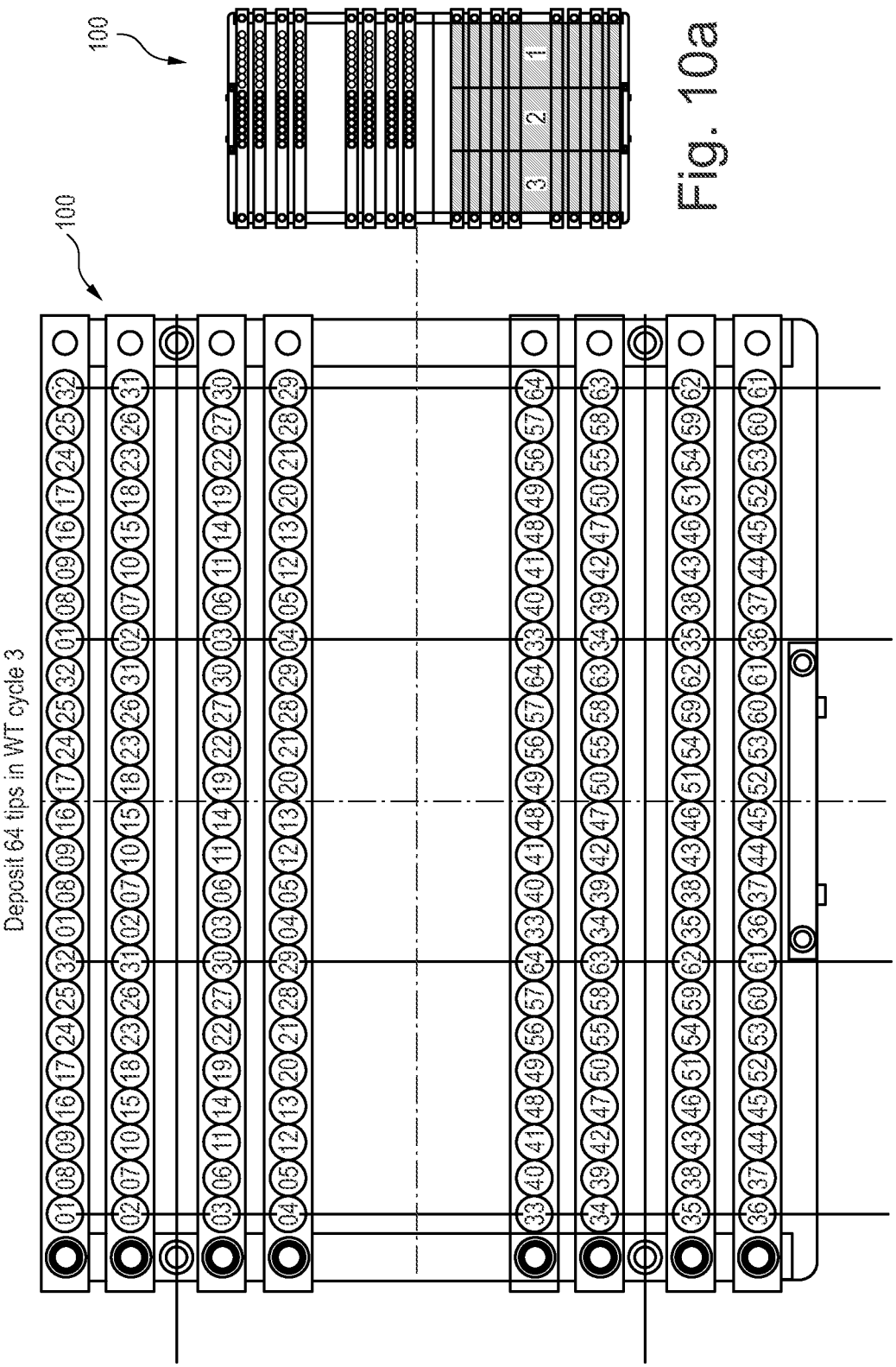
Figure 11:
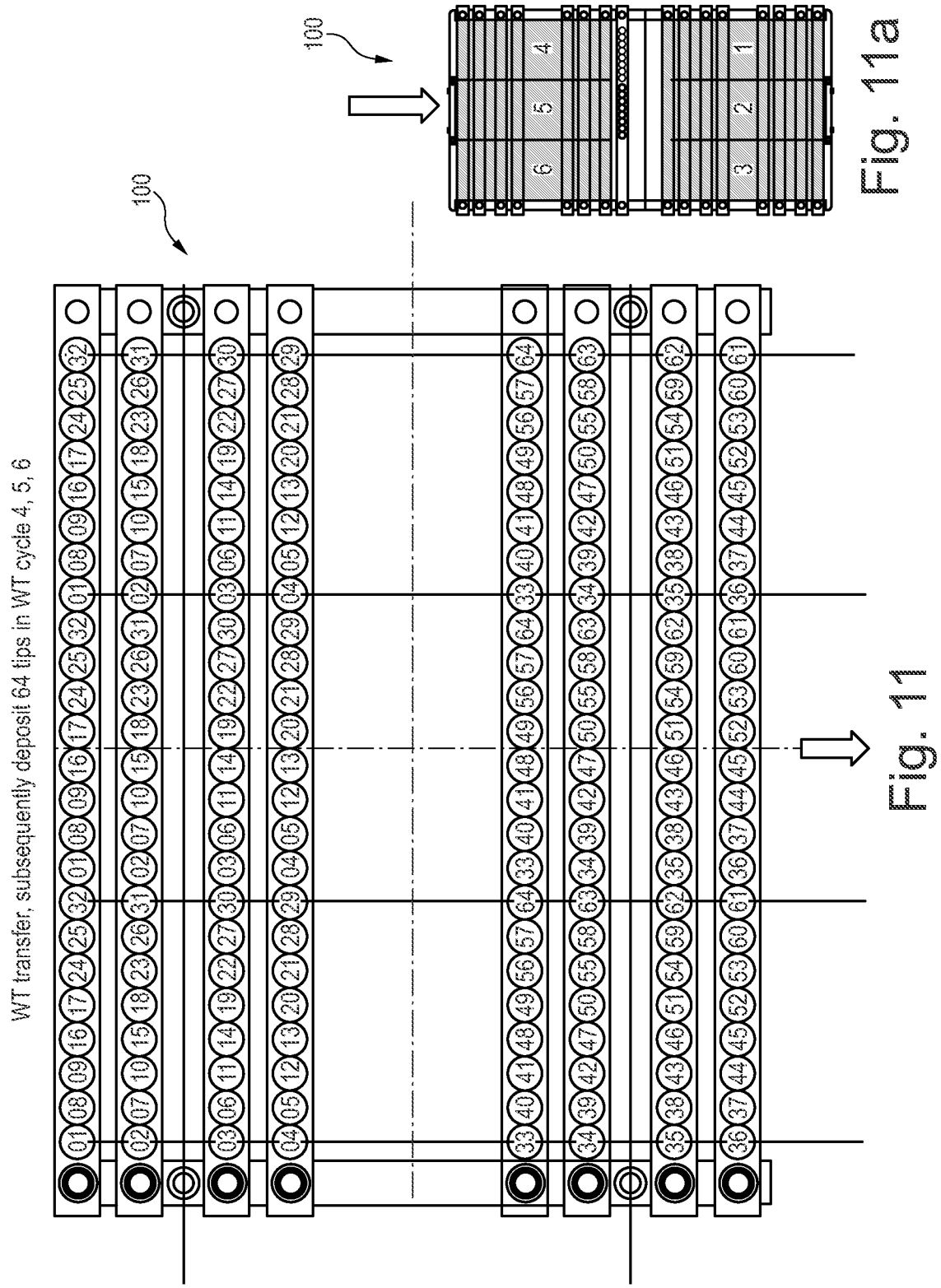
FIG. 11a shows the whole workpiece holder with the sections 1 to 6.

FIG. 11 shows, corresponding to FIG. 10, the injection molded parts of three further removal cycles 4, 5 and 6 in the second half of the workpiece holder 100 and the corresponding sections 4 to 6 in FIG. 11a.

Figure 12:
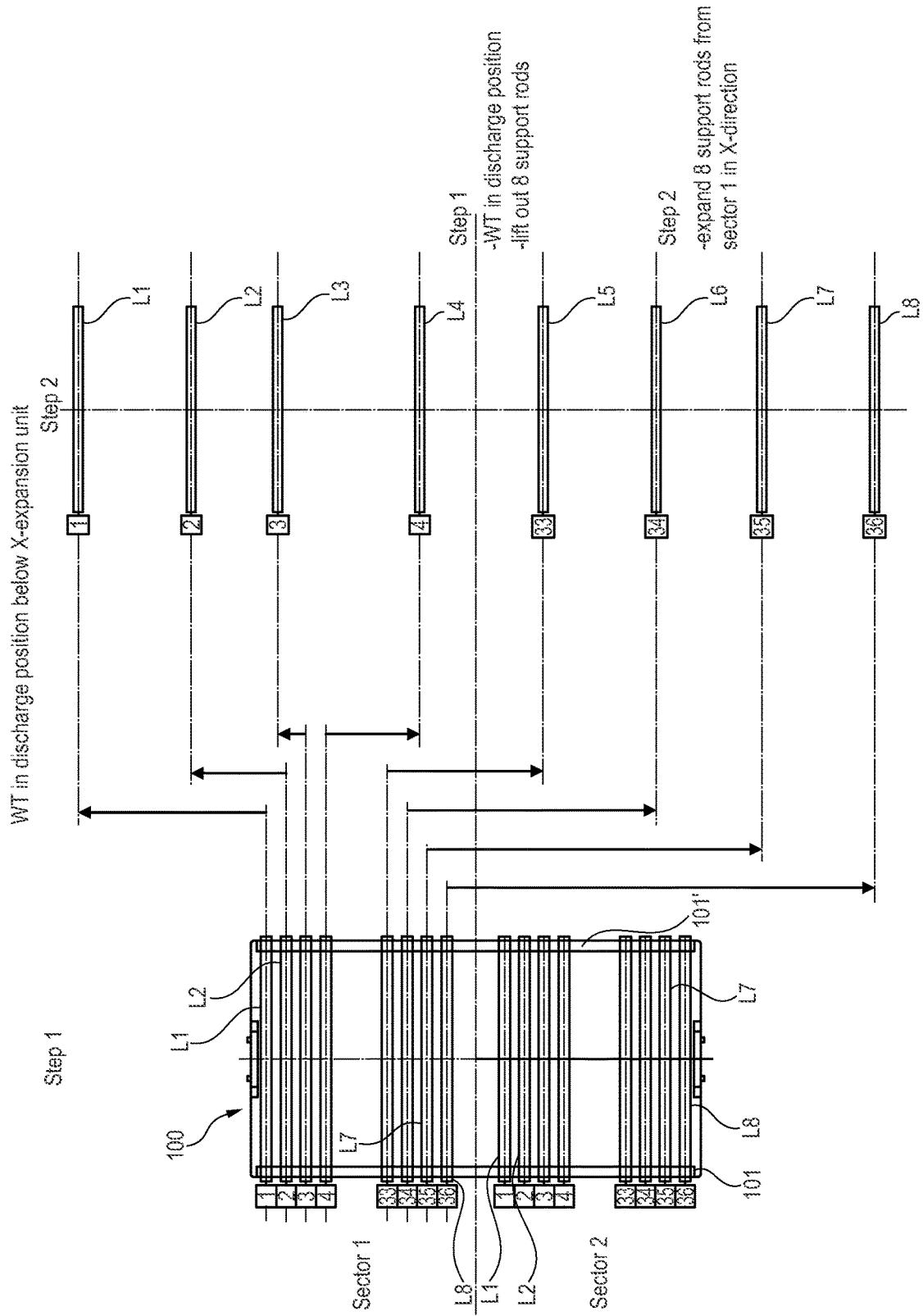
FIG. 12 is a schematic representation of the expansion of the support rods of the workpiece holder in an x-direction at the sector 1 of the workpiece holder.
Figure 13:
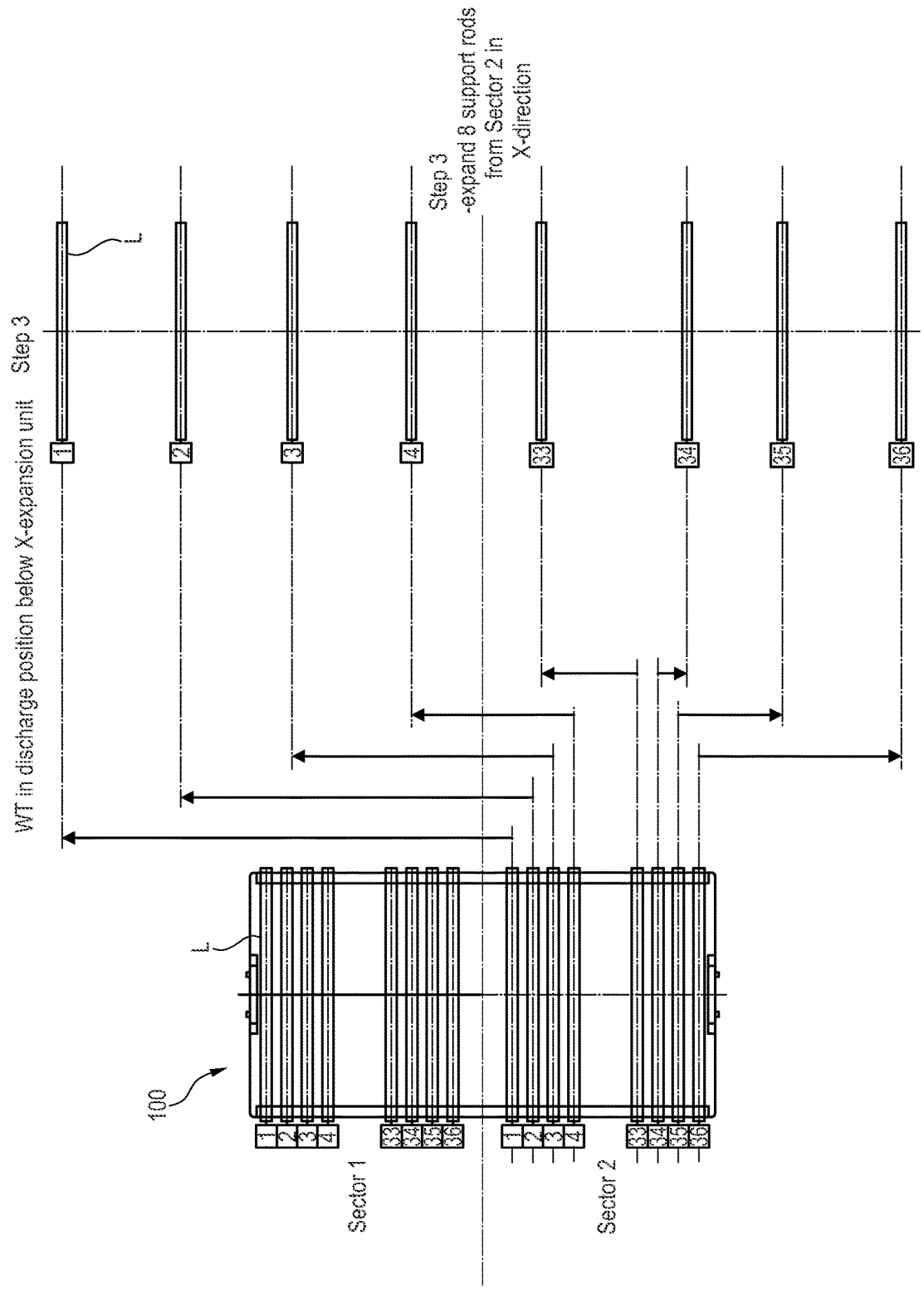
FIG. 13 shows a view, corresponding to FIG. 12, of the expansion of the support rods of the sector 2 in x-direction.

Starting from the workpiece holder 100 represented in FIG. 11a completely filled with sections 1 to 6, expansion steps one to three, shown in FIGS. 12 and 13, are carried out.

The individual support rods L are removed from the two longitudinal supports 101, 101' and transferred on a device, not shown, to the position expanded in x-direction shown in FIGS. 12 and 13, in which the individual support rods L in an x plane have a larger distance from one another than at the workpiece holder 100.

The arrangement density of the support rods L at the workpiece holder 100 can also be embodied in a different way than that shown in FIGS. 12 and 13.

During expanding in X-direction transversely in relation to the longitudinal extension of the support rods L, the individual support rods are positioned at equal distances from one another, wherein each support rod L is occupied along its length by injection molded parts from three removal cycles, as FIG. 11 shows.

In a first step in FIG. 12, the eight support rods L1 to L8 of the workpiece holder sector 1 are lifted out of the workpiece holder 100 in an unloading position thereof, and in a second step the eight support rods L1 to L8 of this sector 1 are moved away from one another in X-direction such that the eight support rods L have a predetermined larger distance from one another, wherein the distance between the individual support rods L is selected to be the same size.

The distance in the expanded state can also be dimensioned differently depending on the filling pattern of the packing containers.

In a third step in FIG. 13, the sector 2 of the workpiece holder is expanded in the same manner, so that the eight support rods L of the sector 2 are transferred into the spaced-apart group of support rods L in FIG. 13 which, in the embodiment shown, corresponds to the group of expanded support rods L in FIG. 12.

FIG. 14 shows the expanded support rods L1 to L8, wherein only the eight rods L of a sector 1 or 2 from FIG. 13 are shown.

Transverse or perpendicular to the support rods L positioned in an x plane, transfer rods T are arranged thereabove in a z plane relatively close to one another, and these transfer rods T extend over the dimension of the expanded support rods L and are arranged close to one another in such a manner that in each case a transfer rod T is located above a vertical row of injection molded parts in FIG. 11.

In FIG. 11, in the right section 1 and 4 in each case there are eight vertical rows of injection molded parts. Correspondingly, in FIG. 14, eight transfer rods T1 to T8 are arranged above these eight vertical rows of injection molded parts in the z plane.

In FIG. 14, the injection molded parts are removed from the support rods L and received in corresponding recesses in the transfer rods T. The transfer can be carried out, for example, by sucking of the injection molded parts by means of the transfer rods T, wherein the transfer rods T shown in FIG. 14 each receive an injection molded part at the intersections with the support rods L.

The eight transfer rods T1 to T8 shown in FIG. 14 are expanded, after the receiving of the injection molded parts from the support rods L, in z-direction in a z plane (FIG. 17) transverse or perpendicular to the longitudinal extension of the transfer rods T or in longitudinal direction of the support rods L, and positioned above a rack buffer 200, shown in FIG. 15, in such a manner that the expanded transfer rods T are positioned in each case above the first vertical row in a rack.

In the embodiment shown, in FIG. 15, the rack buffer 200 has 64 racks 201 to 264 corresponding to the number of 64 cavities in the injection molding tool (FIG. 1), wherein FIG. 15a shows, in an enlarged view, an individual rack 232.

The racks in FIG. 15 are numbered with the numbers 1 to 64 according to the numbering of the cavities in the injection molding tool (FIG. 1).

In other words, in the embodiment shown, the racks 201 to 264 are filled in a cavity-specific manner.

The numbers of the injection molded parts in the rack 232 no longer correspond to the cavity numbers, but to the numbers of the removal cycles. After 96 injection molding cycles, the rack 232 is filled with 96 injection molded parts from the cavity 32.

During these removal cycles, the workpiece holder (WT) is changed a plurality of times, as indicated in FIG. 15a.

The arrangement of the support rods L expanded in X-direction in FIG. 14 and the transfer rods T expanded in z-direction in FIG. 15 substantially forms a lattice structure in which the individual rods form lattice bars, wherein the spacing of these from one another can be varied, wherein the support rods L in the x plane in the plan view are offset from the expanded transfer rods T in the z plane in FIG. 15, which lies in the y-direction above the x plane.

The rows of injection molded parts in the support rods L are designated in the claims as first rows L and the rows of injection molded parts in the transfer rods T are designated as second rows T.

With this lattice arrangement of first rows L and second rows T, for example the second rows T in FIG. 14 can have a distance from one another in relation to the dense arrangement, by means of which the lattice structure is clarified.

FIG. 16 shows, for further clarification, a perspective view of the arrangement in FIGS. 14 and 15, wherein the z-expansion unit consisting of the eight transfer rods T1 to T8 is arranged above the right section 1 and 4 of the sections 1 to 6, shown in FIG. 11, of the support rods L.

In FIG. 16, P represents an arrow which represents the transfer of the injection molded parts from the support rods L into the transfer rods T in Y-direction.

Figure 17:
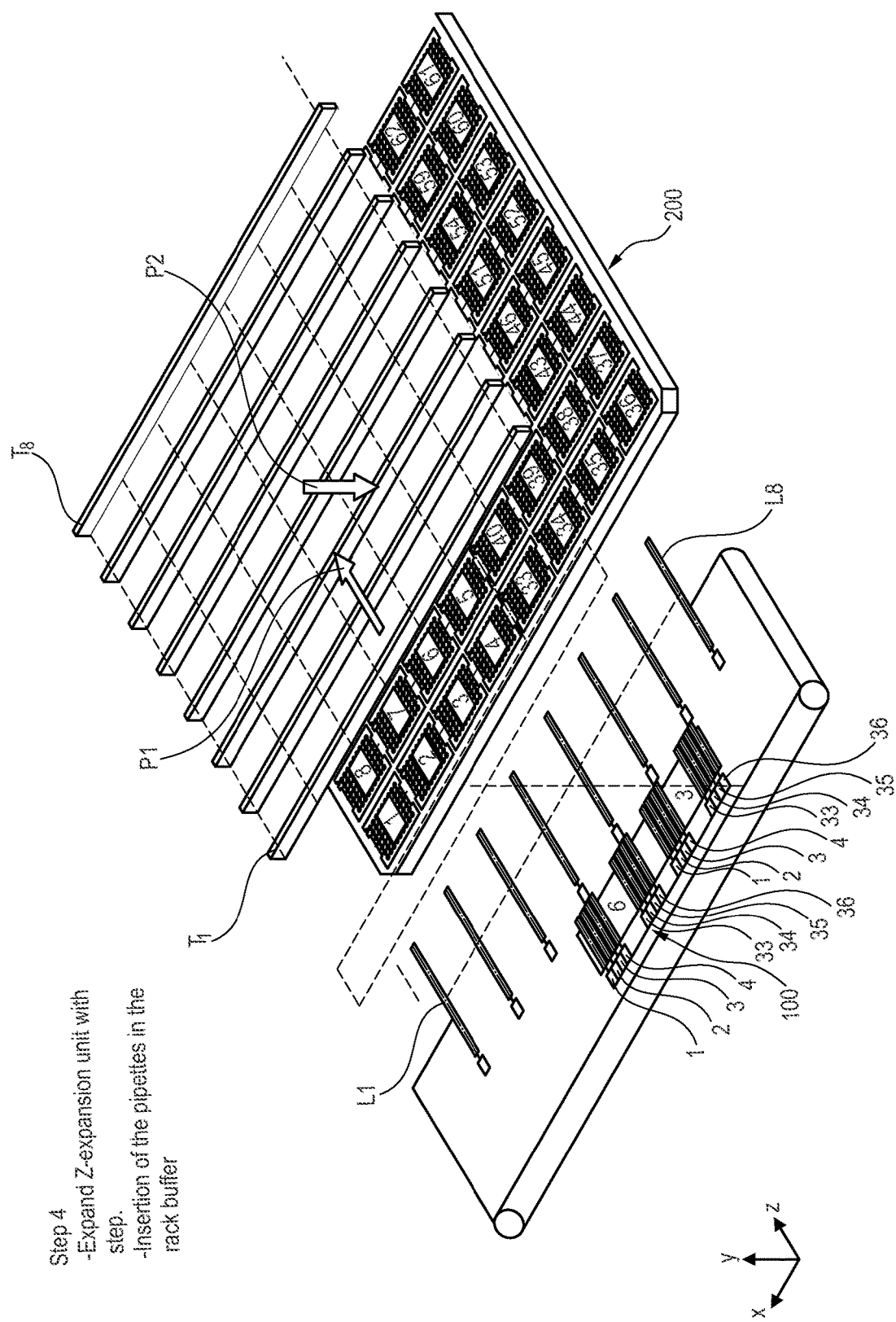
FIG. 17 shows the unit of transfer rods, not yet expanded in FIG. 16, during the expansion in z-direction above the rack buffer.

After the transfer of the injection molded parts from the expanded support rods L by the z-expansion unit in FIG. 16, the transfer rods T are expanded in z-direction in the z plane along the arrow P1 and positioned above the rack buffer 200, as shown in FIG. 15, wherein FIG. 17 shows this in a perspective view. From the position in FIG. 15 and FIG. 17, the injection molded parts are transferred in accordance with the arrow P2 in FIG. 17 against the y-direction downward into the individual racks.

In the embodiment shown, the injection molded parts numbered 01 to 04 and 33 to 36 in FIG. 11 are in the first vertical or perpendicular row of the expanded support rods L.

Correspondingly, the eight transfer rods T in FIG. 14 take over the first eight perpendicular rows of injection molded parts in FIG. 11, so that the top first horizontal row with the numbers 01 to 32 of the injection molded parts is received by the transfer rods T1 to T8. The same transfer of the injection molded parts takes place in the expanded rows, positioned therebelow, of support rods L to the transfer rods T.

In FIG. 14, in a first cycle, the first eight vertical rows of injection molded parts of the support rods L of the sector 1 are received by the transfer rods T1 to T8, expanded in the direction of the arrow Pz and distributed to the racks 201 to 264 of the rack buffer 200, as shown in FIG. 15, wherein the transfer rods T, after expansion, insert an injection molded part in the first perpendicular row of a rack.

FIG. 15a shows that, during this cycle 1, the injection molded part numbered 1 is inserted in the rack 232.

After transfer of the injection molded parts into the racks, the transfer rods T are pulled together again and positioned above the middle eight perpendicular rows of the support rods L, whereupon in a second cycle the distribution of the injection molded parts from the support rods L to the racks 201 to 264 takes place after expansion again of the transfer rods T, wherein the rack buffer is offset by one step upward in x-direction, so that an injection molded part of the cavity 32 is inserted in the rack 232 at the position numbered 2 in FIG. 15a.

In a third cycle, the process is repeated above the third section of the support rods L in FIG. 14.

After the third cycle, the support rods L in FIGS. 14 and 16 are emptied, whereupon they are pulled together and inserted into a workpiece holder 100 or onto its longitudinal supports 101, 101' for filling again.

At the same time, the still full support rods L of the second sector 2 of the workpiece holder 100 are brought into the position in FIG. 14, so that the cycles 4 to 6 described above can start.

The transfer rods T can be mounted in a stationary means for expanding in z-direction and for contracting, for receiving again of injection molded parts from the support rods L, while the support rods L for the lifting-off of workpiece holder 100, expanding in x-direction and returning into another workpiece holder 100, are freely movable after emptying.

FIG. 15 shows eight horizontal rows of racks in the rack buffer 200, while the transfer rods T only extend slightly over seven rows of racks. In order to be able to completely fill the racks from the transfer rods T also in the lower row, the rack buffer 200 in FIG. 15 is preferably displaced upward in relation to the z expansion unit of the transfer rods T, as shown in FIG. 19 by the arrow Px.

It is also possible to move the transfer rods T in relation to the rack buffer 200 in x-direction to fill the racks.

FIGS. 18 and 19 show the displacement of the rack buffer 200 in X-direction upwards in relation to the position in FIG. 15.

FIG. 14 shows the transfer rods T above the right of the three sections of the support rods L corresponding to the cycles 1, 2 and 3, while FIG. 18 shows the transfer rods T in a cycle 5 above the middle section of the support rods L.

In a previous cycle 4, the transfer rods T were in each case positioned above a first row in the racks according to FIG. 15, whereupon, after the transfer rods T were emptied, these were pulled together again in the direction of the arrow in FIG. 18 and positioned above the central section of the support rods L.

In FIG. 18, the transfer rods T in the cycle 5 take over injection molded parts 01 to 04 and 33 to 36 from the support rods L, whereupon the transfer rods T are positioned above the individual racks after expansion in z-direction, as shown in FIG. 19.

In FIG. 14, in the first cycle, in each case position 1 in the rack 232 was occupied by an injection molded part, as shown in FIG. 15a.

In the cycle 4 described above, an injection-molded part from the cavity 32 in the position 4 in FIG. 18a was inserted into the displaced-upward rack buffer 200, whereupon the emptied transfer rods T were moved into the position in FIG. 18 above the support rods L.

After the removal of the injection molded parts in FIG. 18 by the transfer rods T, these are expanded in Z-direction above the rack buffer 200, wherein the rack buffer is displaced by a further step upward in X-direction, as shown in FIG. 19 by the arrow Px, so that during emptying of the transfer rods T an injection molded part with the numbering 5 corresponding to cycle 5 is inserted in the rack 232, as shown in FIG. 19a.

Correspondingly, in the further cycles, the rack buffer 200 is displaced upward in x-direction, in each case by one step corresponding to a horizontal row in a rack buffer, until the injection molded parts can be inserted from the lowest support rod L8 into the lowest horizontal row of the racks 236 to 261 which, in FIGS. 18a and 19a, is provided with the numbers 12, 24, 36.

In FIGS. 15a, 18a and 19a, the filling of the rack 232 with injection molded parts from the cavity 32 of the injection molding tool is provided with numbers 1 to 96, which no longer correspond to the cavity number, but rather to the change of the workpiece holder after different cycles of the removal of injection molded parts from the injection molding machine.

The rods L and T form holding means for the injection molded parts, so that during the transfer by means of the rods L and T the injection molded parts themselves do not have to be moved. In this way there is no risk of damage for the injection molded parts during the movement of the rods L and T.

Preferably, each of the transfer rods T and/or of the support rods L is provided with its own drive, like for example a servo motor, stepper motor or a linear motor, which can be controlled by an electronic control unit for individual displacement of the individual rods.

This results in a large variety of adjustable lattice structures, wherein the individual lattice bars are formed by the rods L and T. The lattice structures can thus be adapted to smaller or larger packing containers.

However, it is also possible, by means of an external means (not shown), to bring the individual rods into a corresponding position without each individual rod having its own drive.

By means of the movement of the injection molded parts inserted in rods L and T, during distribution in a storage or in packing containers these injection molded parts are moved individually only during the transfer from the support rods L into the transfer rods T and from these into the packing containers.

The rack buffer 200 shown in FIG. 15 can be provided in a practical embodiment of a packing device in double arrangement wherein, after filling of the rack buffer in FIG. 15, it is displaced to the right, and for a further cycle, an empty rack buffer is arranged adjacent to the z-expansion unit with the transfer rods T, so that this second rack buffer can be filled step-wise, while the racks can be removed from the first completely filled rack buffer and, for example, packed in film in a packing machine.

Various modifications of the described designs are possible. For example, the first and/or the second rows of injection molded parts can also be expanded in each case in the longitudinal direction of the rows and not only transverse in relation to the longitudinal extension. In this way, different patterns of the provision of the injection molded parts for filling of a storage or of packing containers can be provided.

It is also possible to arrange the injection molded parts removed from the injection molding machine in a workpiece holder in which perpendicular or vertical and horizontal rows are arranged in compact arrangement, whereupon a freely selectable arrangement of injection molded parts can be removed from the workpiece holder and expanded to a predetermined dimension, whereupon injection molded parts of a selected arrangement are transferred into second rows, from where a storage or packing containers is or are filled.

These diverse possibilities result from the forming of first rows or first groups in an x plane after removal from the workpiece holder, and the transfer of rows or groups into a z plane, wherein in the x plane and/or in the z plane an expansion is also possible in directions vertical in relation to one another.

The pick-up configuration (distance) of the expanded support rods L and the discharge configuration (distance) of the transfer rods T during insertion into the packing containers or into the storage, are variable and freely selectable. This results in a high potential for variation during the designing of the size of the packing containers and the number of injection molded parts per shot of the injection molding machine for the distribution and filling of the packing containers. For example, instead of the described number of 64 cavities, a number of 128 cavities can be provided with a corresponding enlargement of the workpiece holder or its division into several sections instead of the shown sections 1 to 6 (FIG. 11*a*). In the same way, a reduction in the number of cavities to, for example, 32 per shot, can be provided.

In a corresponding manner, the individual racks can be designed larger or smaller according to the number of cavities, in particular when the racks are to be filled in a cavity-specific manner.

The invention claimed is:

1. A method for packing of injection molded parts, which are removed from cavities of an injection molding machine and inserted into a storage or into packing containers,
   the injection molded parts are arranged in a workpiece holder,
   the injection molded parts are removed from the workpiece holder in a form of first rows and these first rows are expanded along a first axis, wherein the first axis is transverse to a longitudinal direction of the injection molded parts,
   whereupon the injection molded parts are removed from the expanded first rows in the form of second rows which extend perpendicular in relation to the first rows, and
   the second rows are expanded along a second axis, wherein the second axis extends in a longitudinal direction of the first rows,
   whereupon the injection molded parts from the second rows are inserted into packing containers or into storage.

2. The method of claim 1, wherein the packing containers are arranged in rows, which are next to one another and extend parallel to the second rows, for filling from the second rows.

3. The method according to claim 2, wherein at an intersection between expanded first rows and not-expanded second rows, an injection molded part is respectively transferred to the second rows and the injection molded parts from the second rows after their expansion are inserted into the packing containers.

4. The method according to claim 2, wherein for the filling of the packing containers or of the storage from the second rows, a relative displacement between the second rows and the packing containers or the storage in a longitudinal direction of the second rows is carried out.

5. The method according to claim 1, wherein, from the workpiece holder filled up after a plurality of removal cycles, the injection molded parts are distributed to the first rows in such a way that injection molded parts, which are removed from the same cavity of an injection molding tool, are positioned one below the other in the first rows, so that the second rows receive injection molded parts of the same cavity from the first rows respectively.

6. A device for packing of injection molded parts, which are removed from cavities of an injection molding machine and inserted into a storage or into packing containers, comprising:
   a workpiece holder which has removable support rods for receiving injection molded parts in first rows,
   a device for expanding the removable support rods removed from the workpiece holder transverse in relation to their longitudinal extension along a first axis, wherein the first axis is transverse to a longitudinal direction of the injection molded parts, transfer rods, which are arranged perpendicular in relation to the removable support rods for receiving injection molded parts in second rows, and a device for expanding the transfer rods transverse to their longitudinal extension and along a second axis, wherein the second axis extends in a longitudinal direction of the first rows.

7. The device according to claim 6, wherein the packing containers are arranged in rows, which lie next to one another and which extend parallel to the transfer rods, and the transfer rods are expandable in such a way that in each case a transfer rod can be positioned above a row of packing containers.

8. The device according to claim 7, wherein the packing containers are displaceable in the longitudinal direction of the transfer rods in relation thereto, or the transfer rods in the direction of their longitudinal extension are displaceable in relation to the packing containers.

9. The device according to claim 6, wherein the transfer rods are in each case provided with a servomotor for displacement in relation to one another, which can be controlled by an electronic control means.

10. The device according to claim 6, wherein each transfer rod is provided with a means for receiving the injection molded parts from the support rods and for discharging the injection molded parts into the packing containers.

\* \* \* \* \*